United States Patent [19]
Norman et al.

[11] 3,783,616
[45] Jan. 8, 1974

[54] CONTROL METHOD FOR DETONATION COMBUSTION ENGINES

[75] Inventors: Leslie W. Norman, Scottsdale; Skillman C. Hunter; George A. Russell, both of Phoenix, all of Ariz.

[73] Assignee: The Garrett Corporation, Los Angeles, Calif.

[22] Filed: Mar. 2, 1961

[21] Appl. No.: 92,827

[52] U.S. Cl. ..................................... 60/204, 60/270
[51] Int. Cl. ............................................. B63b 11/00
[58] Field of Search ............ 60/35.3, 35.5, 35.6 RJ, 60/35.6 L, 35.6 LL, 204

[56] References Cited
UNITED STATES PATENTS

| | | | |
|---|---|---|---|
| 2,024,274 | 12/1935 | Campini | 60/35.3 X |
| 2,480,626 | 8/1949 | Bodine | 60/35.3 |
| 2,612,019 | 9/1952 | Halford et al. | 60/35.5 |
| 2,911,787 | 11/1959 | Barry | 60/35.6 L |
| 3,040,516 | 6/1962 | Brees | 60/35.6 RJ |
| 2,540,594 | 2/1951 | Price | 60/356 RJ |

*Primary Examiner*—Samuel Feinberg
*Attorney*—Hershel C. Omohundro, Jack D. Puffer and Albert J. Miller

EXEMPLARY CLAIM

1. A method of operating a hypersonic aircraft powered by a hypersonic detonation combustion engine of the thermodynamic duct type, and wherein the aircraft includes means for generating standing oblique shock waves in the airstream approaching the duct inlet and the duct includes a constricted combustion zone between said inlet and the duct exhaust nozzle, means for generating standing oblique shock waves in the airstream within the duct between said inlet and zone, a forwardly hinged, angularly adjustable ramp in and defining a wall of said zone for generating a standing oblique shock wave in the airstream within said zone, means at the exhaust end of said zone for generating a standing normal shock wave in the airstream as the latter emerges from said zone, and means for injecting fuel into said airstream within the duct between said inlet and zone, whereby the static temperature of the airstream is successively elevated across said shock waves and said fuel undergoes steady state detonation across said normal shock wave, said operating method comprising the steps of:

regulating the rate of fuel flow to said duct in response to changes in speed of the aircraft to maintain said aircraft speed in the hypersonic range for which the shock wave generating means of the aircraft and engine are designed; and simultaneously adjusting the angle of said ramp in predetermined relation to the rate of fuel flow to said duct to maintain the specific fuel consumption at a predetermined optimum value.

1 Claim, 5 Drawing Figures

PATENTED JAN 8 1974
3,783,616
SHEET 1 OF 2
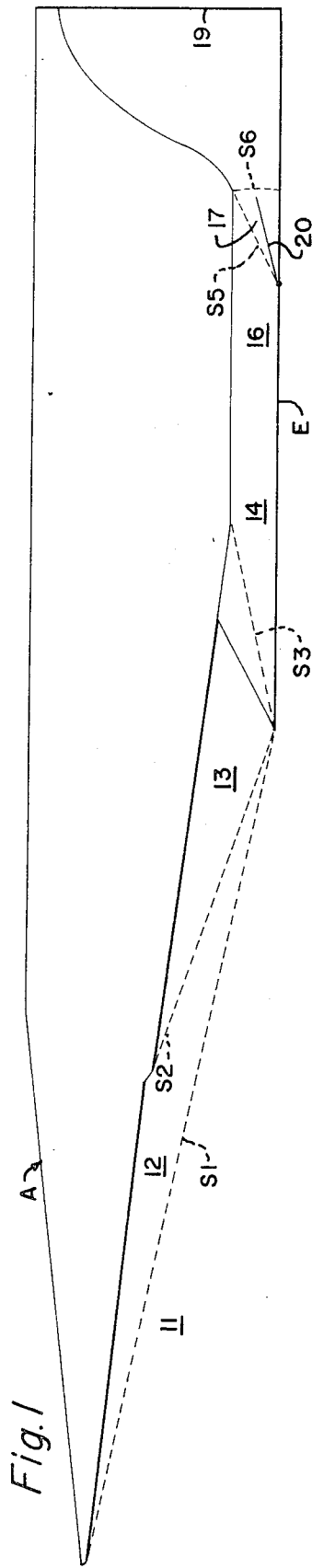
Fig.1
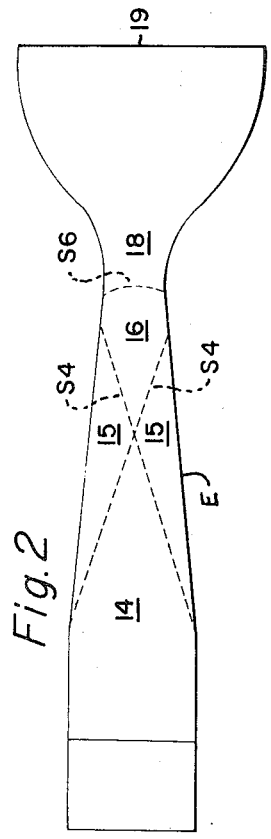
Fig.2
| REGION | total pressure (PSIA) | static pressure (PSIA) | total temp (°R) | static temp (°R) | mach number (M) | velocity (FPS) |
|---|---|---|---|---|---|---|
| 11 | 191.2 | .0541 | 3850 | 460 | 6.50 | 6820 |
| 12 | 187.4 | .0943 | | 542 | 5.88 | 6710 |
| 13 | 186.8 | .1444 | | 614 | 5.52 | 6700 |
| 14 | 155.8 | .6250 | | 975 | 4.18 | 6380 |
| 15 | 150.7 | 1.3263 | | 1145 | 3.64 | 6420 |
| 16 | 147.5 | 2.5069 | | 1437 | 3.24 | 6200 |
| 17 | 132.6 | 7.3472 | 3650 | 1820 | 2.50 | 5450 |
| 18 | 54.4 | 36.8 | 5385 | 4950 | 0.801 | 2730 |
| 19 | 53.4 | .0677 | 5385 | 1070 | 5.0 | 8335 |
Fig.3
INVENTORS
LESLIE W. NORMAN
SKILLMAN C. HUNTER
BY GEORGE A. RUSSELL
Francis B. Beber
ATTORNEY

CONTROL METHOD FOR DETONATION COMBUSTION ENGINES

This invention relates to the operation of hypersonic airbreathing aircraft and aims to provide a method of controlling the fuel and air flow in a detonation combustion engine in such an aircraft so as to maintain an efficient, substantially constant, hypersonic flight speed.

In the copending application of Hunter and Norman, Ser. No. 88,149 filed Feb. 9, 1961, a detonation combustion engine is disclosed which is designed specifically for use in hypersonic aircraft. According to the Hunter and Norman application, the flame front or detonation is established and maintained by positioning and maintaining a stable aerodynamic shock system in a variable geometry aerothermodynamic duct or engine such that the heat release occurs across a shock wave, rather than being maintained by a flame holder as is the case in conventional internal combustion processes such as occur in ramjet and turbojet engines. Steady state detonation is established and maintained across a standing shock wave of fixed position relative to a confining structure therefor, and subsequent expansion of the gaseous detonation product is used to develop a continuous thrust.

The present invention is based on the discovery that it is possible to incorporate the principles of detonation combustion in a variable geometry engine which will operate with optimum efficiency at a free stream Mach number of 6 to 7 and that such substantially constant Mach number and optimum efficiency may be maintained during flight by properly controlling the principal variables. Variations in the free stream Mach number, such as might be caused by mass change, aircraft maneuvering, external load upsets, and the like, are used to control the feeding of fuel to the injector nozzles and also the angle of an adjustable ramp immediately upstream of the detonation wave. Adjustment of the ramp angle effects a change in the pressure, temperature and velocity of the combustible mixture flowing through the engine to the detonation zone so that it is possible to regulate the properties of the combustible mixture entering the detonation wave and hence the combustion process itself. Adjustment of the ramp angle serves the further purpose of preventing combustion upstream of the detonation wave in the event of adverse engine operating conditions.

It is therefore an object of this invention to provide a method of controlling the operation of a detonation combustion engine so as to provide optimum efficiency at a substantially constant hypersonic free stream Mach number.

Another object of this invention is to provide a method of controlling the operation of a hypersonic vehicle having a detonation combustion engine in which the free stream Mach number is observed and then the fuel-air ratio is adjusted to effect minimum fuel consumption and optimum efficiency.

A further object of this invention is to provide a method of controlling the operation of hypersonic aircraft powered by a detonation combustion engine having an adjustable ramp therein for varying the flow of the combustible mixture to the detonation zone in which the fuel flow and ramp angle are varied in response to changes in the free stream Mach number.

Still another object of this invention is to provide substantially constant Mach number operation of a vehicle having a hypersonic detonation combustion engine, including an adjustable ramp in the combustion zone and means for controlling the flow of fuel to said zone, such constant Mach number operation being accomplished by observing the free stream Mach number and then regulating the adjustable ramp and fuel flow to effect optimum fuel consumption for the selected constant Mach number operation.

The above and other objects of the invention will be apparent from the following description and the accompanying drawings, in which:

FIG. 1 is a schematic side elevational view of an aircraft having a detonation combustion engine in which the present method of control may be practiced;

FIG. 2 is a schematic plan view of the detonation combustion engine shown in FIG. 1;

FIG. 3 is a table of the values of pressure, temperature, Mach number, and velocity prevailing in the various flow regions of the engine shown in FIGS. 1 and 2;

Figure 4:
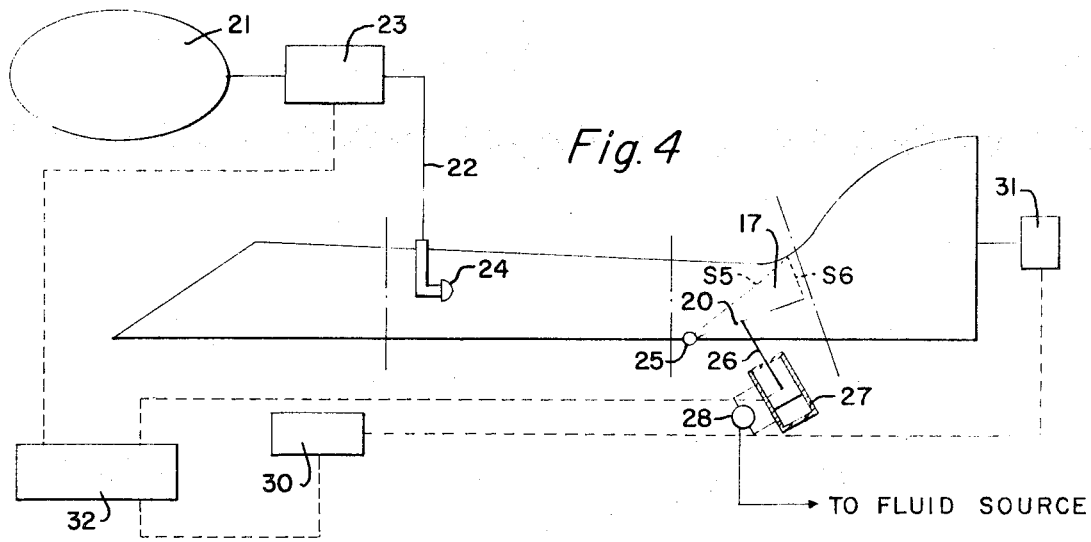
FIG. 4 is a schematic sectional view of the detonation combustion engine, including a diagrammatic showing of one system of measuring and control devices which may be used in the practice of the method of this invention.

As used herein, a "detonation" may be defined as a wave in which an exothermic chemical reaction takes place and which moves with supersonic velocity with respect to the undetonated reactant gas. Detonation is characterized by this supersonic propagation velocity and a large pressure and temperature increase across the wave. A detonation differs from a subsonic flame in that such a flame moves with subsonic velocity and its microscopic propagation mechanisms are fundamentally different. The supersonic combustion wave produces strong detonation which is stable, steady, reproducible, and obtainable over a wide fuel-air ratio as long as the Mach Chapman-Jouguet of the approach flow is greater than the Chapman-jouguet Mach number for that fuel-air ratio. A "Chapman-Jouguet" detonation is characterized by the fact that the flow immediately behind the wave is sonic, i.e., a Mach number of one, and such a detonation represents the minimum supersonic propagation Mach number for a given fuel-air ratio.

Experiment has shown that detonation combustion takes place under the following conditions:

1. a stream of gases is moving supersonically relative to the containment vessel or aerothermodynamic duct;

2. the total temperature of the supersonic gas stream must exceed the detonation temperature of the gas stream;

3. the gas stream consists of a mixture of some oxidizer, such as air, and unburned fuel, such as hydrogen; and 4. a shock system of such strength is generated at some point in the aerothermodynamic duct that the static temperature across the shock system is high enough to cause detonation.

This type of detonation can occur across a normal shock wave whence the Mach number downstream of the shock wave will be subsonic. The same phenomena may occur across an oblique shock wave as long as the static temperature downstream of the shock wave is sufficiently high to cause detonation.

Referring now to FIGS. 1 and 2, a hypersonic aircraft A, shown schematically, is powered by a detonation combustion engine or aerothermodynamic duct E to produce hypersonic speeds in the range of 6 to 7 Mach number at an altitude of 125,000 feet. The design of the airframe and the inlet of the engine are such as to produce a series of shock waves $S_1$, $S_2$, $S_3$, $S_4$, $S_5$, and $S_6$, which will slow the captured flow from a free stream Mach number of 6.5 to a Mach number of 2.5 at the inlet to the detonation zone. The manner of producing the shock waves to accomplish this reduction in Mach number, with an attendant increase in static pressure and static temperature, is fully described in the copending Hunter and Norman application referred to above. Briefly, the design of the airframe is such that first and second critical shock waves $S_1$ and $S_2$ are produced upstream of the inlet to the engine E. These waves define regions 12 and 13 wherein the pressure, temperature, velocity, and Mach numbers have the values shown in the table of FIG. 3. Region 11 is the free stream adjacent the aircraft. The geometry of the engine is such that shock waves $S_3$ and $S_4$ are formed and create regions 14, 15 and 16 where the physical conditions are as tabulated in FIG. 3. Next, critical shock wave $S_5$ is created by the hinged leading edge of an adjustable ramp or door 20 which is arranged in the combustion zone immediately upstream from the normal shock wave $S_6$. This last wave $S_6$ is the one across which detonation combustion takes place. Wave $S_5$ creates zone 17, immediately prior to combustion, and the physical conditions in this zone are at least partially controlled by the angle of the adjustable ramp, as will be described more fully hereinafter.

The table of FIG. 3 shows that a stepwise increase in static temperature accompanies each successive shock wave in the aircraft and engine duct system. To take advantage of this increase, a fuel, such as hydrogen, having a detonation temperature below the static temperature occurring in the normal shock wave $S_6$ is recommended. The FIG. 3 table also indicates that the static temperature occurring in the flow region 17 downstream of oblique shock wave $S_5$ may be higher than the temperature required for initiation of combustion in the air-hydrogen mixture. The time required for this mixture to traverse region 17 is so short, however, in comparison to the time needed to achieve combustion, that the mixture may remain chemically unaffected until it reaches the normal shock wave $S_6$ and region 18. Here the static temperature rises abruptly with consequent detonation of the mixture and a further increase in static temperature to 4,950°R, as shown in FIG. 3. Finally the gas is expanded in the exhaust nozzle 19 to produce the desired thrust and ultimate velocity.

In the event that the operating conditions tend to deviate from those for which the engine E and its associated shock wave system are designed, preignition may occur in region 17. If this should happen, the angular position of the ramp 20 may be adjusted, in accordance with this invention, so as to increase the Mach number in the region 17 and thus simultaneously reduce the static temperature and restore the combustion process to the region of the normal shock wave $S_6$ wherein detonation is excited.

Inasmuch as no static temperature equal to or greater than the ignition temperature of hydrogen exists upstream of the shock wave $S_6$ in the steady state operation of the engine, it will be apparent that the fuel may be introduced into the air flow at any point forward of said shock wave. Accordingly, fuel is introduced into the air flow upstream from the region 17, such as in the region 14, so as to take advantage of the mixing afforded by the system of successive shock waves $S_3$, $S_4$ and $S_5$. As shown in FIG. 4, fuel from a suitable tank 21 carried by the aircraft A may be fed through a conduit 22, having a suitable flow control valve 23 therein, to a plurality of injection nozzles 24. These nozzles may be of any suitable construction which will distribute the fuel flow throughout the cross section of the engine in the plane of the nozzles so as to effect thorough intermixing of the hydrogen fuel with the airstream.

It has been found that operation of the aircraft A at cruising speeds between Mach 5.5 and Mach 7 at an altitude of about 125,000 feet provides optimum operation of the engine E to afford a cruising range of 6,500 miles with a practical amount of fuel. These, however, are examples of only one set of design conditions of hypersonic operation. It has also been discovered that it is possible to maintain a substantially constant Mach number of 6.5 by continuously observing the free stream Mach number and then adjusting the fuel flow through the valve 23 and the angle of the ramp 20 in accordance with the relationships charted in FIG. 5, as will be explained below. To effect the desired adjustment of the angle of ramp 20, said ramp is hinged at 25 across the bottom of the main engine duct and is operatively connected by an actuating arm 26 to a suitable actuator 27, which in this instance may be a hydraulic piston-actuator controlled by a conventional switch valve 28. The free stream Mach number may be observed in any suitable manner, such as by a pitot tube type of sensor 30 which may be arranged to read the Mach number directly, or obtain a pressure differential by comparison with the exhaust stream velocity, for example, through a second sensor 31. Data obtained from speed sensor 30, or sensors 30 and 31, may be fed to a control center 32 for observation by the pilot or flight engineer.

Depending upon the size and specific design of the engine E, it has been determined that for variations in free stream or cruising flight Mach number in the hypersonic range of from 5.5 to 7.0, for example, the minimum specific fuel consumption (SFC) is maintained at about 1.0 pounds of fuel per hour per pound of thrust developed, or within the range of 0.9 to 1.0. To maintain this specific fuel consumption, the fuel flow is varied from about 1,000 pounds per hour for a Mach number of 5.5, to about 4,000 pounds per hour for a Mach number of 7.0; and the angle of the combustor ramp is simultaneously adjusted between 0° for a Mach number of 5.5 and about 20° for a Mach number of 7.0.

Figure 5:
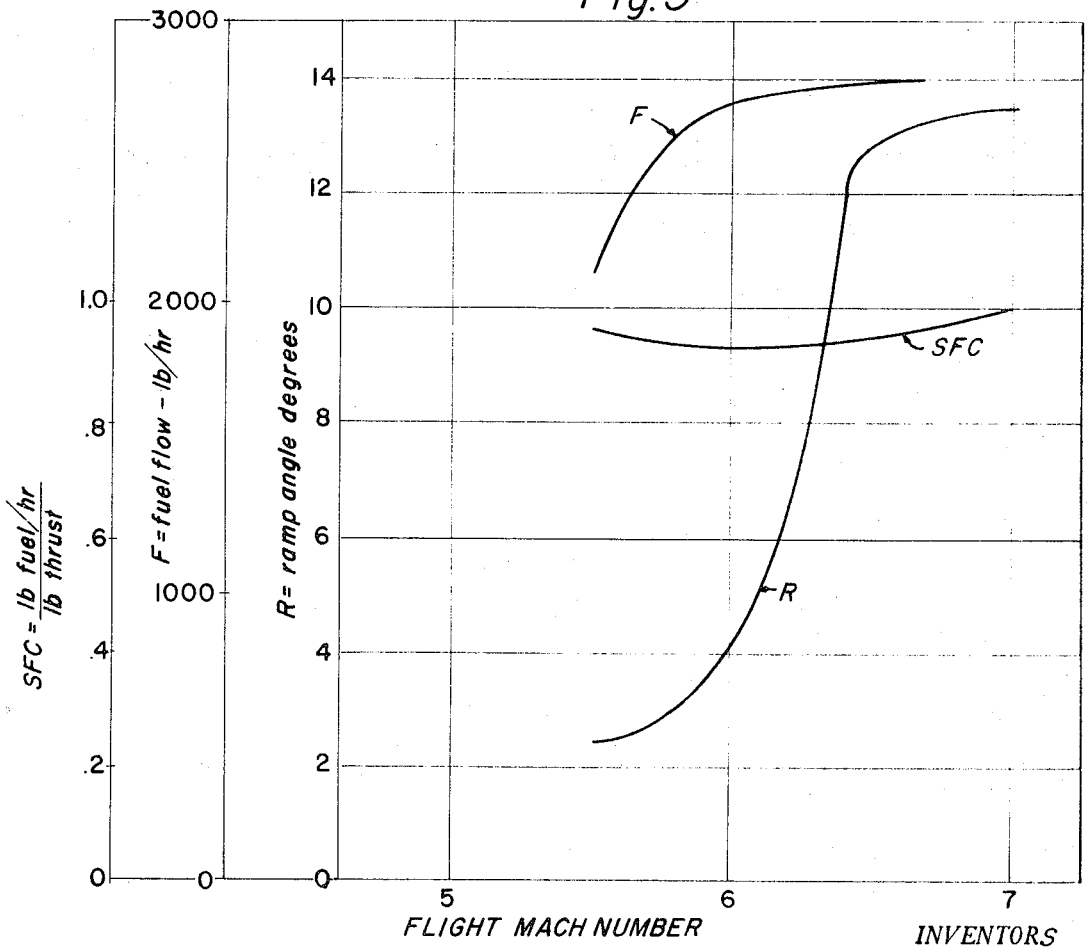
FIG. 5 is a chart showing the relationship of fuel flow and adjustable ramp angle to free stream Mach number.

In FIG. 5, a chart of these relationships is shown for one specific engine which has been designed and constructed in accordance with the methods and principles of this invention. Referring to FIG. 5, it will be noted that curve SFC shows the slight variations in specific fuel consumption between about 0.95 for a Mach number of 5.5 and 1.0 for a Mach number of 7.0. Curve F shows the fuel flow variations to maintain this SFC and indicates that there should be a fuel flow of about 2,000 pounds per hour for a Mach number of 5.5, and that the fuel flow increases to about 2,800 pounds per hour along curve F for a Mach number of 7.0. To effect corresponding changes in temperature, pressure and velocity of the fuel-air mixture in the combustion zone and thereby reduce or eliminate the tendency for detonation in the combustion zone, the angle of the adjustable combustion ramp is varied from about 2° for a Mach number of 5.5, along curve R, to about 14° for a Mach number of 7.0.

Where Mach numbers of 5.5 to 7.0 are referred to herein, these are merely examples of hypersonic speeds which have been selected for purposes of illustration.

It will be understood that various changes may be made in the design of the detonation combustion engine shown and described herein without departing from or sacrificing any of the advantages of the method of control in accordance with this invention.

We claim:

1. A method of operating a hypersonic aircraft powered by a hypersonic detonation combustion engine of the thermodynamic duct type, and wherein the aircraft includes means for generating standing oblique shock waves in the airstream approaching the duct inlet and the duct includes a constricted combustion zone between said inlet and the duct exhaust nozzle, means for generating standing oblique shock waves in the airstream within the duct between said inlet and zone, a forwardly hinged, angularly adjustable ramp in and defining a wall of said zone for generating a standing oblique shock wave in the airstream within said zone, means at the exhaust end of said zone for generating a standing normal shock wave in the airstream as the latter emerges from said zone, and means for injecting fuel into said airstream within the duct between said inlet and zone, whereby the static temperature of the airstream is successively elevated across said shock waves and said fuel undergoes steady state detonation across said normal shock wave, said operating method comprising the steps of:

regulating the rate of fuel flow to said duct in response to changes in speed of the aircraft to maintain said aircraft speed in the hypersonic range for which the shock wave generating means of the aircraft and engine are designed; and simultaneously adjusting the angle of said ramp in predetermined relation to the rate of fuel flow to said duct to maintain the specific fuel consumption at a predetermined optimum value.

* * * * *